July 13, 1965  L. J. MILLER  3,193,995
COMBINE
Filed April 12, 1961  5 Sheets-Sheet 3
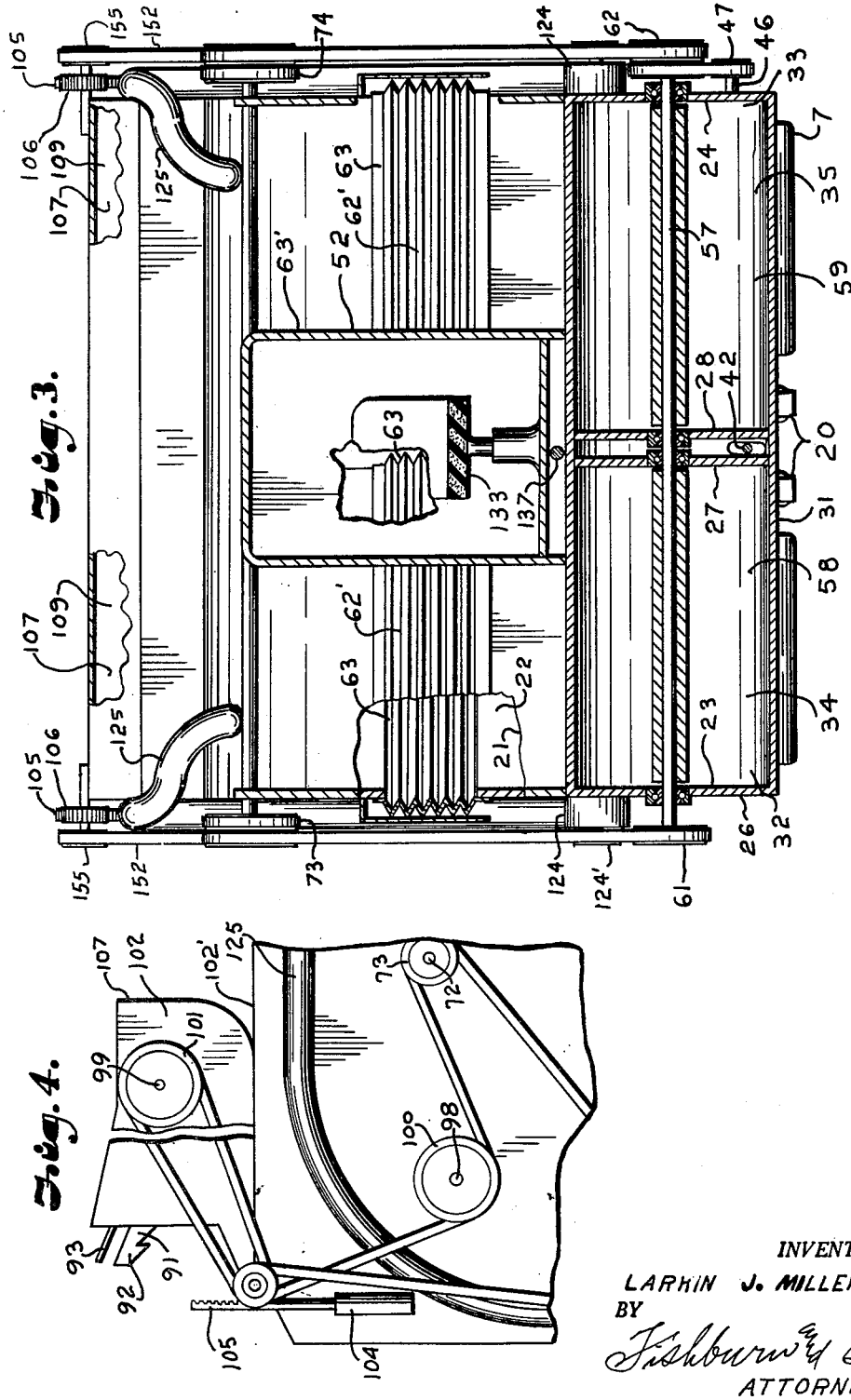
INVENTOR.
LARKIN J. MILLER
BY
Fishburn & Gold
ATTORNEYS

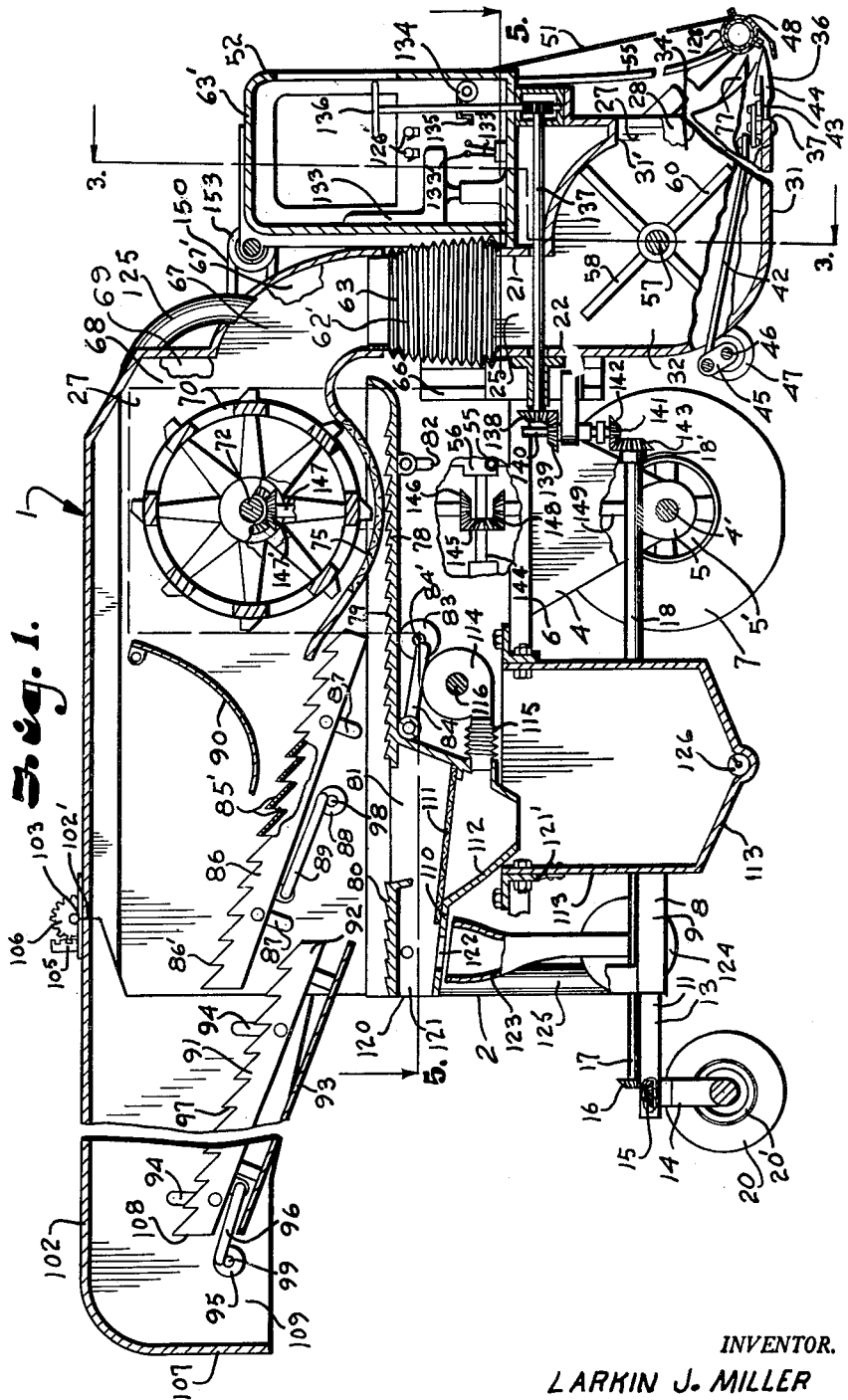

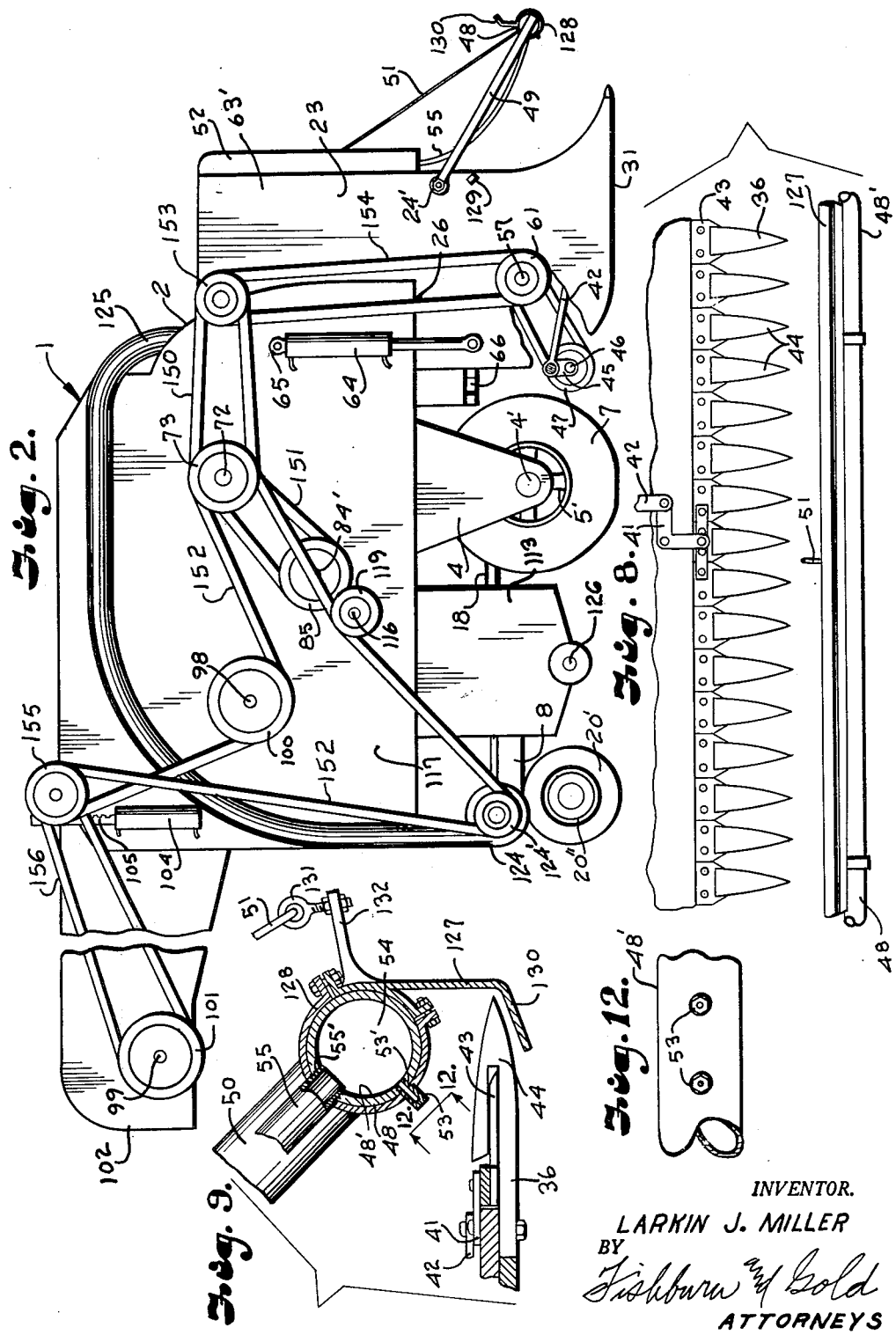

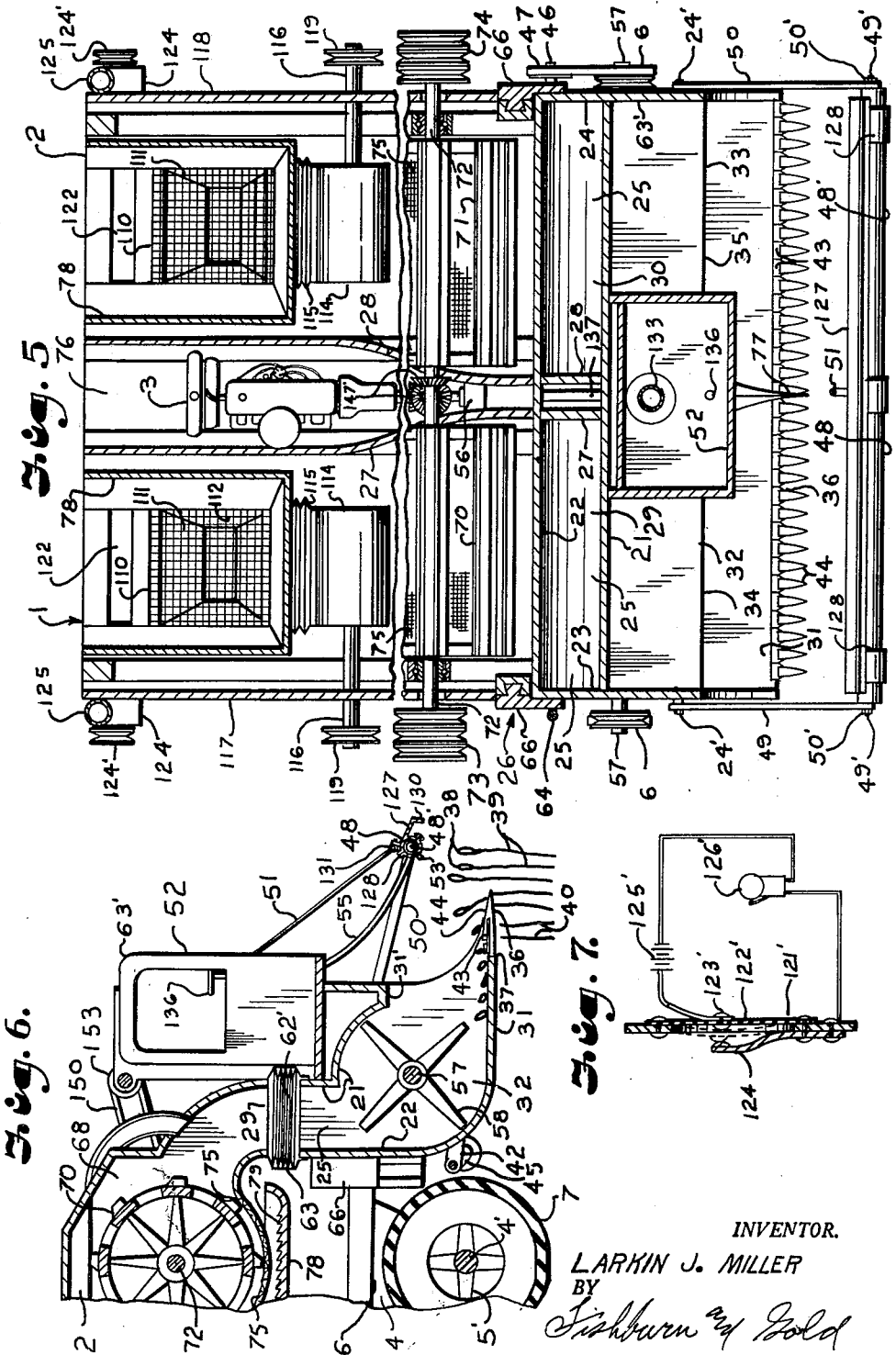

July 13, 1965 L. J. MILLER 3,193,995
COMBINE
Filed April 12, 1961 5 Sheets-Sheet 5
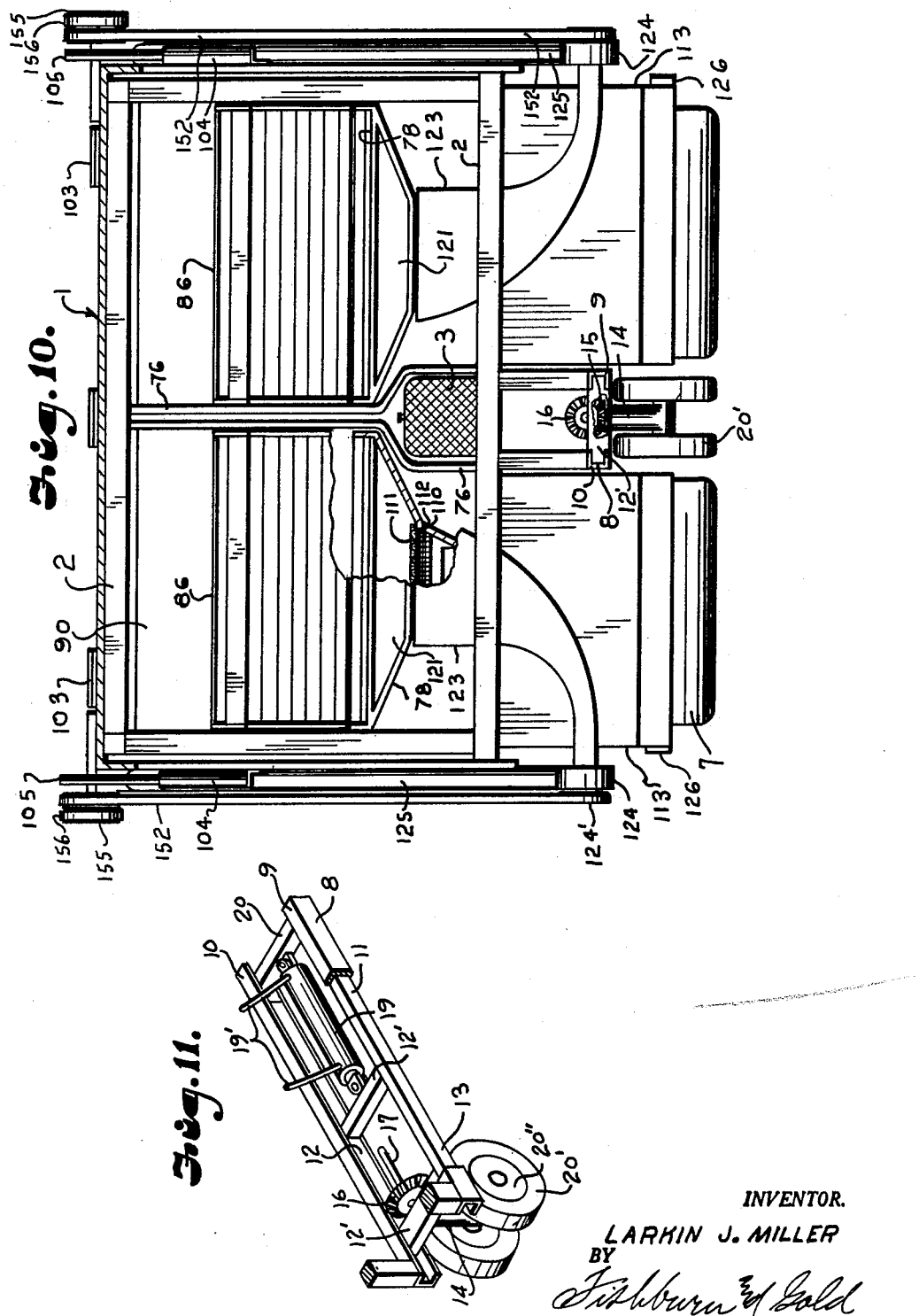
INVENTOR.
LARKIN J. MILLER
BY
*Fishburn & Gold*
ATTORNEYS United States Patent Office 3,193,995
Patented July 13, 1965

3,193,995
COMBINE
Larkin J. Miller, P.O. Box 365, King City, Mo.
Filed Apr. 12, 1961, Ser. No. 102,476
1 Claim. (Cl. 56—21)

This application is a continuation-in-part of my co-pending application, Serial No. 809,498, filed April 28, 1959, for Self Propelled Combined Harvesting Machine, now abandoned.

This invention relates to combines, and more particularly to improvements in machines of the class known as "Harvester-Threshers" wherein the harvesting mechanism is combined in a single apparatus with the threshing and separating mechanism.

Existing combines, particularly of the self propelled type, are highly complex devices having a high center of gravity and which are characterized by limited threshing capacity, extensive self-contained grain elevating equipment, a high degree of instability, particularly at higher operating speeds, and poor visibility at the point of grain head severing. In addition, these devices are adapted with a large diameter feeding reel which violently contacts the grain heads in urging them toward the cutting mechanism and, in doing so, often produces shattering which results in a significant portion of the grain falling to the ground where it is wasted. Such harvesting machines are cumbersome, awkward and time-consuming in transporting over highways and setting up for operation in the harvesting area.

It is the principal objects of the present invention to provide a thresher-harvester of significantly greater grain handling or threshing capacity than existing apparatus of comparable size; to provide such a combine that easily operates over rough or rolling terrain at high speed; to provide such a machine which provides improved visibility for the operator by significantly shortening and maintaining constant the distance between the operator's cab and the cutting mechanism; to provide such a combine that eliminates self-contained elevating equipment for grain by providing grain storage tanks at the bottom of the machine; to provide such a combine which presents an extremely low center of gravity to reduce swaying which tends to limit ground speed; to provide such a machine wherein harvested grain is protected from being contaminated with moisture resulting from flash rains while in the field; to provide such a thresher-harvester which is short, low and compact whereby it is easily and quickly loaded upon a common flat bed truck without troublesome overage; to provide such a combine wherein the grain is fed into the threshing cylinder in a thin film rather than a deep mass whereby threshing efficiency is increased; to provide such a machine having an induction bar or blow pipe which produces streams of air to urge standing grain against the cutter mechanism and into the combine receiving mouth without shattering and consequent grain loss; to provide grain head elevating means in the form of delivery fans whereby the heads may be urged upwardly toward the threshing cylinders in a substantially vertical path thereby eliminating complex and large platform conveyor elevators; to provide an apparatus configuration which tends to eliminate the bunching and slugging of grain; is quickly and easily rendered inoperative when encountering weeds or the like during roadside operation or crossing, thoroughly and rapidly separates the grain from the straw, and is simple and reliable in construction and use.

Other objects and advantages of this invention will become apparent from the following description taken in connection with the accompanying drawings, wherein are set forth by way of illustration and example certain embodiments of this invention.

FIG. 1 is a sectional view through the combine-harvester in side elevation showing the relationship between the major components thereof.

FIG. 2 is a view of the thresher-harvester in side elevation showing the driving belts and tailings return pipe.

FIG. 3 is a section view taken on the line 3—3, FIG. 1, showing the relationship of the operator's cab to the delivery fans.

FIG. 4 is a fragmentary view of the upper rear portion of the thresher combine showing the pivotally secured tail housing in over-the-road transporting position.

FIG. 5 is a sectional view through the thresher-harvester taken on the line 5—5, FIG. 1, particularly showing the position of the engine.

FIG. 6 is a fragmentary sectional view through the forward portion of the apparatus showing the cutter mechanism in raised position for cutting tall grain.

FIG. 7 is a detailed sectional view on an enlarged scale showing a signal device positioned in the grain tanks for indicating a full grain load therein.

FIG. 8 is a fragmentary plain view of the sickle cutter bar.

FIG. 9 is a detailed sectional view on an enlarged scale particularly showing the weed guard in sickle covering or weed passing position.

FIG. 10 is a rear elevation of the thresher-harvester showing the tailings funnels.

FIG. 11 is a detailed fragmentary view showing the extensible rear tire mounting and steering means.

FIG. 12 is a fragmentary view taken on the line 12—12, FIG. 9, showing the blower pipe or induction bar nozzles.

Referring to the drawings in more detail:

The reference numeral 1 generally indicates my improved thresher-harvester apparatus. The apparatus 1 is comprised of a mobile frame 2 supporting an internal combustion engine 3 for propelling and operating the apparatus 1 in a manner which will become apparent hereinafter. A front tire mounting structure 4 including a shaft 4' operatively connected to a differential drive mechanism 5 for rotating wheels 5' is rigidly secured to the mobile frame 2 by suitable means such as welding at 6. A pair of very low pressure wide track tires 7, sometimes known as "Terra" tires are rotatably mounted on the wheels 5' and together extend laterally of the mobile frame 2 a substantial portion of the transverse dimension of said frame as best seen in FIG. 10. The tires 7 permit the apparatus 1 to be driven at a high rate of speed over rough or rolling terrain without excessive lurching and swaying, presenting a stable grain cutting mechanism to the grain stalks as described hereinafter.

A rear tire mounting assembly 8, best seen in FIG. 11, is comprised of spaced channels 9 and 10 secured longitudinally of the frame 2 and equidistant from the sides thereof. The channels 9 and 10 respectively slidably support channels 11 and 12 which, with cross members 12' form a telescoping supporting cage 13 to which is pivotally secured a wheel supporting structure 14. The wheel supporting structure 14 is rotatable on a vertical axis with respect to the supporting cage 13 by means of a bevel gear 15 which is secured to the structure 14 and mates with a bevel gear 16. The bevel gear 16 is secured to a steering shaft 17 adapted to telescope within a spline shaft 18 (FIG. 1) which is retained longitudinally stationary with respect to the mobile frame 2 with a bearing support 18' when the supporting cage 13 is extended rearwardly thereof. An extensible hydraulic ram 19 has the opposite ends thereof respectively secured to the supporting cage 13 and a cross member 20 fixed to the channels 9 and 10, whereby selectively introducing and withdrawing hydraulic fluid into and from the hydraulic ram 19 through hoses 19' will position the wheel-supporting structure 14 in a desired position longitudinally of the mobile frame 2 in order to increase the length of the wheel base thereof for stability during use of the thresher-harvester apparatus and yet be able to shorten same to prevent over-jet or overage when trucking the apparatus over the road. Suitable conventional tires 20' are mounted on the spaced wheels 20" of the wheel-supporting structure 14 to provide engagement with the ground.

A forward wall 21, a rear wall 22 and side walls 23 and 24 are respectively maintained spaced from each other to form a vertically extending enclosure 25 situated near the forward portion 26 of the frame 2 and extending transversely substantially the entire width thereof, FIG. 5. A pair of spaced vertically extending center walls 27 and 28 divide the enclosure 25 into a first passageway 29 and a second passageway 30. A forwardly extending substantially horizontal platform or feeder plate 31 is secured adjacent the lower terminus of the passageways 29 and 30 forming therewith fan housings 32 and 33 respectively communicating with the passageways 29 and 30. The platform 31 is spaced from the lower edge 31' of the forward wall 21 forming therewith, and the center walls 27 and 28, grain head receiving mouths 34 and 35 respectively communicating with the fan housings 32 and 33. A sickle bar cutter 36 extends transversely substantially the width of the mobile frame 2 and is operatively secured adjacent the leading edge 37 of the platform 31 for severing grain heads 38 from stalks 39 and leaving stubble 40 as the thresher-harvester apparatus proceeds across a grain field, FIG. 6. The sickle bar cutter 36 is operated by means of a center pivoted elbow link 41 reciprocably driven with a shaft 42 extending longitudinally of the frame 2 between the center walls 27 and 28, FIGS. 1 and 3. The link 41 is pivotally secured to and drives an elongated slide cutter 43 cooperating with the sickle teeth 44 to sever the grain heads. The shaft 42 is reciprocably driven with a rotating crank 45 fixed to a shaft 46 which is driven by a pulley 47 in a manner described hereinafter.

A blower pipe or induction bar 48 comprising an elongated tube 48' is supported at opposite ends thereof by means of arms 49 and 50 in a position normally upwardly and forwardly of the sickle bar cutter 36 and extending substantially parallel thereto. Threaded pins 49' extend from the ends of the tube 48' through the arms 49 and 50 and carry nuts 50' to permit rotational adjustment of the tube 48' with respect to the arms 49 and 50. The arms 49 and 50 are respectively pivotally mounted on the side walls 23 and 24 at 24'. The induction bar 48 is maintained in spaced relation with respect to the sickle bar cutter 36 by means of a cable 51 anchored at one end to the tube 48' and at the other end within the operator's cab 52 in a manner described hereinafter. The induction bar 48 has spaced nozzles 53 threadedly engaged in threads 53' thereon and communicating with the interior thereof and adapted to direct streams of air toward the grain head receiving mouths 34 and 35. The nozzles 53 direct air pumped into the hollow core 54 of the tube 48' through an air supply pipe 55 coupled to the tube 48' by means of threads 55' and fed by means of a suitable pump 56 driven by the engine 3. Rotational adjustment of the induction bar is accomplished by loosening the nuts 50'. The induction bar 48 eliminates the usual feed reel which often shatters the grain heads by violent contact therewith, replacing such contact with a gentle blowing action which urges the grain heads against the sickle bar cutter 36 and into the receiving mouths 34 and 35 without grain loss.

A shaft 57 is rotatably mounted on the side walls 23 and 24 and extends through the fan housings 32 and 33, FIG. 3. Delivery fans 58 and 59 having circumferentially spaced radial blades 60 are supported on the shaft 57 for rotation respectively in the fan housings 32 and 33. The fans 58 and 59 are adapted to blow the grain heads upwardly through the respective passageways 29 and 30 and into contact with threshing apparatus described hereinafter. The shaft 57 is driven by means of pulleys 61 and 62 secured to the opposite ends thereof.

Vertically collapsible wall members 63 are positioned between upper and lower sections of the walls 21, 22, 23, 24, 27 and 28 forming intermediate portions 62' in the passageways 29 and 30 and permitting same to be varied in vertical length without air or grain leakage therefrom, in the manner of a bellows. It is apparent from an examination of FIG. 6 that the collapsing of the wall members 63 occurs simultaneously with the raising or vertical adjustment of the forward section 63' of the combine which includes the fan housings 32 and 33, sickle bar cutter 36 and operator's cab 52. An extensible hydraulic ram 64 is located on each side of the mobile frame 2 and has the opposite ends thereof respectively connected to the side walls 23 and 24 and frame 2 at 65 for effecting the vertical adjustment. Suitable vertically extending guides 66 slidably maintain the correct relationship between the forward section 63' and the mobile frame 2.

The upper portions 67 and 67' of the passageways 29 and 30 are fixed relative to the frame 2 and respectively terminate in threshing cylinder housings 68 and 69 positioned directly rearwardly thereof and formed from rearward extensions of the side walls 23 and 24 and center walls 27 and 28. The threshing cylinders 70 and 71 are of the rasp-bar type and are respectively rotatably mounted in the threshing cylinder housings 68 and 69 on a common shaft 72 which is rotatably mounted on the frame 2 and driven by means described hereinafter. Pulleys 73 and 74 are fixed to the opposite ends of the shaft 72 for a purpose also described hereinafter. Concaves 75 of the type including perforated grates are fixed to the frame 2 closely spaced beneath the threshing cylinders 70 and 71 and cooperate therewith to thresh grain entering the threshing cylinder housings 68 and 69 from the passageways 29 and 30.

The center walls 27 and 28 taper away from each other as they extend downwardly and rearwardly of the threshing cylinder housings 68 and 69 forming a pod or enclosure 76 for containing the engine 3, FIG. 5. The center walls 27 and 28 extend forwardly of the fan housings 32 and 33 and terminate in contact with each other to form a grain separating point 77 juxtaposed to the sickle bar cutter 36 whereby the grain heads are separated immediately prior to cutting and are not permitted to contact a leading wall edge during passage through the combine about which clumps may form to interfere with combine operation.

Grain pans 78 are located beneath the concaves 75 on opposite sides of the walls 27 and 28 for receiving threshed grain passing therethrough. The grain pans 78 extend horizontally and rearwardly within the frame 2 and have on the upper surface thereof a plurality of transverse rows of rearwardly facing teeth 79 and forwardly facing teeth 80. The rows of teeth 79 and 80 respectively ace toward grain delivery openings 81 in the grain pans 78. The grain pans 78 are reciprocably mounted for horizontal motion with respect to the mobile frame 2 by means of pivotally mounted arms 82. Rotatable crank members 83 are pivotally connected to links 84 which in turn are connected to the under surfaces of the grain pans 78 to reciprocably drive said pans. The crank members 83 are driven by means of a common shaft 84' extending transversely of the frame 2 and having suitable pulleys 85 secured to the opposite ends thereof. The reciprocal motion of the grain pans 78 rends to move the grain received thereon toward the grain delivery openings 81 regardless of whether the grain is resting on the teeth 79 or 80.

A main fishback straw rack 86 of the type including a perforated grate 85' is positioned rearwardly of each of the concaves 75 and in overlapping relation therewith for receiving straw therefrom. The straw racks 86 exhibit rearwardly facing teeth 86' and are inclined upwardly as they extend rearwardly of the frame 2 and are reciprocably mounted by means of arms 87 on the frame 2. Suitable cranks 88 having links 89 pivotally connected thereto and to the straw racks 86 reciprocate said racks to urge the straw rearwardly and upwardly with respect to the frame 2. Grain which has not separated from the straw while between the concave 75 and the threshing cylinders 70 and 71 tends to separate due to the reciprocating motion on the straw racks 86, whereupon it falls therethrough onto the grain pans 78 which extend therebeneath.

A deflecting curtain 90 which may be of sheet metal or fabric is secured to the frame 2 above each of the main straw racks 86 to urge straw into overall and even contact therewith for the purpose of increasing the grain separating efficiency of the straw racks. Tail straw racks 91 which are similar to the main straw racks 86 are positioned rearwardly of the straw racks 86 and have a front portion 92 overlapping beneath each of the main racks for receiving straw therefrom. A slide plate 93 is secured to each of the tail straw racks 91 in spaced relation therebeneath and is inclined downwardly toward the grain pans 78 whereby grain falling on the surface thereof is directed into the grain pans 78. The tail straw racks 91 are reciprocably mounted on pivotal arms 94 and reciprocably driven by means of rotatable crank members 95 through links 96 secured thereto. The straw on the tail straw racks 91 is urged rearwardly of the frame 2 by the rearwardly facing teeth 97 thereon.

The cranks 88 and 95 which drive the straw racks 86 and 91 are fixed respectively to shafts 98 and 99 extending transversely through the frame 2. The shafts 98 and 99 have pulleys 100 and 101 secured thereto which are driven in a manner described hereinafter.

A tail housing 102 normally extends outwardly and rearwardly of the frame 2 and contains the tail straw racks 91 and the tail straw rack mounting and reciprocating apparatus 94, 95 and 96. The tail housing 102 is pivotally secured to the upper rear edge 102' of the frame 2 by means of a hinge 103 which permits the tail housing 102 to be rotated upwardly and forwardly of the frame 2 in order to reduce the overall length of the thresher-harvester apparatus during over-the-road transit. Hydraulic rams 104 carry gear racks 105 which cooperate with pinions 106 fixed to the tail housing 102 to form a power operated device for rotating the tail housing 102 into alternate operating and transporting positions, tail housing 102 in transporting position being shown in FIGURE 4.

The tail housing 102 exhibits a rear downwardly extending wall 107 spaced rearwardly from the rear portion 108 of the straw racks 91 to form an exit chute 109 extending substantially the width of the frame 2 and adapted to direct straw to the ground in a wide even spread.

A sieve supporting shoe 110 is rigidly connected to and suspended beneath each of the grain pans 78 whereby said shoes 110 reciprocate therewith. A grain sieve 111 is supported on each of the shoes 110 directly beneath the grain pan delivery openings 81 for the purpose of separating any unthreshed grain and straw from the threshed grain. A funnel housing 112 is formed in each sieve supporting shoe 110 beneath the sieves 111 for directing grain passing through the sieves 111 into grain tanks 113 located beneath each of the funnel housings 112. A blower 114 is adapted to exhaust into each of the funnel housings 112 for directing a stream of air upwardly through the sieves 111 which, with the aid of the reciprocating motion of the sieves, separates straw and unthreshed grain often known as tailings from the grain passing through the sieves. The blowers 114 are connected to the funnel housings 112 by means of bellows 115 whereby the funnel housings 112 may reciprocate with the grain pans 78 while the blowers 114 remain stationary with respect to the frame 2. The blowers 114 are driven by means of shafts 116 respectfully extending through opposing side walls 117 and 118 of the mobile frame 2. Pulleys 119 are secured to the outer ends of the shafts 116 for the purpose of rotatably driving same as described hereinafter.

A tailings passageway 120 having an exit opening 121 is located adjacent each of the sieves 111 but on the opposite side thereof from the blowers 114 for directing straw and tailings rearwardly of frame 2. The straw is spewed rearwardly of the frame 2 through exit openings 121 to the ground. A tailings receiving opening 122 is located in each of the tailings passageways 120 for receiving the unthreshed grain which by virtue of its heavier weight separates from the straw and drops therethrough into funnels 123 located directly thereneath. The funnels 123 guide the unthreshed grain entering the tailings openings 122 into a tailings elevator 124 in the form of a blower driven by a pulley 124' located adjacent each side 117 and 118 of the frame 2. A tailings return pipe 125 is operatively connected to each of the tailings elevators 124 for directing tailings upwardly and forwardly of the frame 2 and into the respective threshing cylinder housings 68 and 69 for rethreshing.

A tank emptying device in the form of a grain auger 126 is contained in each of the grain tanks 113 and is adapted to couple with suitable equipment (not shown) for discharging the contents of the tanks 113 while in the field. The tank emptying device is shown here as a grain auger, however, other suitable means may be used to empty the grain tanks without departing the spirit of this invention.

Each of the grain tanks 113 contain a signalling device 121' adapted to inform the operator when one of the tanks is full. The signalling device 121' comprises a flexible membrane 122' such as rubber sheet, supporting an electrical contact 123'. When the tanks become full, the grain urges the contact 123' against a fixed contact 124' which completes an electrical circuit powered by a battery 125' to ring a bell 126' located in the operator's cab 52.

The induction bar 48 includes a weed guard 127 which is rotatably secured to the transverse pipe member 53' by means of ring clamps 128. When the induction bar 48 is allowed to pivot downwardly by releasing tension on the cable 51, the arms 49 and 50 prevent the induction bar 48 for pivoting into contact with the sickle bar cutter 36 due to stops 129 secured to the respective side walls 23 and 24. The slack produced in the cable 51 when the arms 49 and 50 come in contact with the stops 129 permit the weed guard 127 to rotate downwardly so that the lip 130 thereof covers the points of the sickle bar cutter 36 to prevent weeds or similar foreign matter from entering into the apparatus when roads are being crossed or weed patches encountered. The weed guard 127 extends transversely of the frame 2 a length sufficient to cover the entire sickle bar cutter 36 when in guard position as indicated in FIGURE 9. The cable 51 extends through and is secured to an eye bolt 131 rigidly connected to a lever arm 132 which performs the dual function of automatically rotating the weed guard 127 out of guard position and maintaining the induction bar 48 in operating position during harvesting operations.

The operator's cab 52 is secured adjacent the fan housings 32 and 33 and close to the sickle bar cutter 36 whereby the operator may easily observe the cutting mechanism and induction bar operation. The cab 52 contains a suitable seat 133, suitable engine controls 133', a reel 134 adapted to anchor and reel the upper portion of the cable 51 by means of a crank 135, and a steering wheel 136. The steering wheel 136 is geared to a rearwardly extending shaft 137 which drives a bevel gear 138. The bevel gear 138 is mated with a bevel gear 139 operating in cooperation with a spline shaft 140 which is adapted to slide within the bevel gear 139 to provide an effective lengthening of the spline shaft 140 when the forward section 63' is raised by means of the hydraulic rams 64 described above. The lower end 141 of the spline shaft 140 has fixed thereto a bevel gear 142 which mates with a bevel gear 143 to drive the spline shaft 18 for controlling the direction of the wheel supporting structure 14 described above.

It is apparent from the foregoing that the cab 52 is raised and lowered with the sickle bar cutter 36 whereby the operator is always at a constant distance therefrom which aids the operator in performing efficient harvesting operations.

The engine 3 drives the mobile frame 2 through the tires 7 and also powers the harvesting and threshing apparatus as described immediately hereinafter. The engine 3 rotates a shaft 144 upon which is secured a bevel gear 145 which mates with a bevel gear 146 secured to a vertically extending shaft 147 operatively connected by means of gears 147' to the shaft 72 for driving the threshing cylinders 70 and 71 and the pulleys 73 and 74. A second bevel gear 148 is mated with the gear 145 and is fixed to a shaft 149 which extends into the differential mechanism 5 for driving the tires 7 to propel the combine. The engine shaft 144 extends into the pump 56 for driving same to supply air to the induction bar 48 through the pipe 55.

The pulleys 73 and 74 are triple track pulleys which respectively drive pairs of drive belts 150, 151 and 152, located on opposite sides of the combine. The belts 150 rotate idler pulleys 153 which in turn drive belts 154 operatively connected to the pulleys 61 and 62 to rotate the delivery fans 58 and 59. The idler pulleys 153 are secured adjacent the cab 52 and are adapted to move up and down therewith whereby a vertical adjustment of the front section 63' will not excessively slacken either the drive belts 150 or the drive belts 154.

The drive belts 151 induce the rotation of the pulleys 85 which drive the reciprocating grain pans 78. The drive belts 152 drive both the main straw racks and the tail straw racks, as well as the blowers 114 and tailings elevator pulleys 124'. The belts 152 drive the tail straw racks 91 through intermediate idler pulleys 155 which in turn drive belts 156 in contact with the pulleys 101. The idler pulleys 155 are pivotally mounted adjacent the hinge 103 of the tail housing 102 whereby the tail housing may be rotated with respect to the frame 2 without interferring with the belts 152 and 156.

In operation, as the thresher-harvester apparatus is propelled forward on the tires 7 the induction bar 48 gently blows the standing grain toward the sickle bar cutter 36. As the cutter 36 severs the grain heads they are blown rearwardly on the platform 31 by the draft of the induction bar 48 and suction of the fans 58 and 59 into the receiving mouths 34 and 35. The grain heads are blown and flung upwardly by the fans 58 and 59 through the passageways 29 and 30 into contact with the threshing cylinders 70 and 71 where they are threshed between the cylinders and the concaves 75, the threshed grain falling through the concaves 75 onto the reciprocating grain pans 78. The reciprocating motion of the grain pans 78 induces the threshed grain rearwardly toward the grain delivery openings 81 where it falls therethrough onto the reciprocating grain sieves 111. The sieves 111 permit clean grain to pass therethrough where it is guided by means of funnel housings 112 into enclosed grain tanks 113.

Straw and unthreshed grain pass from the concaves 75 to the main reciprocating straw racks 86 and then to tail reciprocating straw racks 91. Grain shaken loose by the grain racks falls therethrough onto the grain pans 78 to join the grain passing through the openings 81 onto the sieves 111. Straw and unthreshed grain which finds their way to the sieves 111 are blown by the blowers 114 rearwardly of the apparatus through the tailings passageway 120, from which the heavier unthreshed grain enters the tailings elevators 124. The tailings elevators 124 blow the unthreshed grain through return pipes 125 to threshing cylinders 70 and 71 for rethreshing. The straw exits from the tailings passageway exit opening 121 and the exit chute 109 to the ground.

The configuration of the thresher-harvester machine described above permits a greatly simplified apparatus which operates with a much higher speed and greater capacity than has heretofore been possible with a machine of the same size and weight. This invention is also highly versatile in that it is quickly adjustable for efficient harvesting of tall or short grain and the wheel base thereof is extendable as desired for greater stability on rolling or rough land. The feeder mechanism is short and wide on the instant invention in contrast with the large, cumbersome elevator platforms which are normally provided to feed the grain into the threshing portion of the combine. This permits not only greater visibility on the part of the operator, but also shortens the overall length of the combine to simplify the transportation thereof on a flat bed truck by eliminating extensive knock-down to prevent overage. The configuration of the feeder mechanism also brings cut grain heads into the combine very quickly before apparatus vibration has a chance to shatter grain heads and permit grain to fall to the ground from which it is never retrieved.

The low portion of the grain tanks 113 with respect to the frame 2 eliminates grain elevation equipment and helps establish a low center of gravity to further stabilize the apparatus for high speed operation over rough terrain. The grain tanks are not open to the weather, whereby in case of a flash rain, grain contained in the tanks will not become wet which would result in grain loss as well as difficulty in unloading.

It is to be understood that while I have illustrated and described one form of my invention, it is not to be limited to the specific form or arrangement of parts herein described and shown except insofar as such limitations are included in the claim.

I claim:

In combination with a grain head harvester-thresher combine having a mobile frame with a forward portion and a rear portion and an engine supported on said frame for propelling and operating said combine; walls supported on said frame and forming an enclosure situated near said forward portion, said enclosure having a forwardly open grain head receiving mouth with a lower portion, a forwardly and transversely extending platform communicating with said mouth at said lower portion having a leading edge, a sickle bar cutter secured adjacent the leading edge of said platform and operably connected to said engine for severing grain heads as said combine moves through a field, a blower pipe, means for supporting said blower pipe on said combine and spaced upwardly and forwardly of said sickle bar cutter permitting grain heads to freely enter therebetween, and means driven by said engine for supplying air to said blower pipe, said blower pipe having means thereon for directing air downwardly and rearwardly toward said cutter whereby standing grain heads are blown rearwardly over said platform prior to cutting, said blower pipe supporting means being pivotally mounted on said combine and adapted to selectively pivotally support said blower pipe in an operating position and a sickle bar adjacent position, said blower pipe having a lip thereon for covering said sickle bar in said latter position for selectively deflecting weeds from said sickle bar.

References Cited by the Examiner

UNITED STATES PATENTS 1,122,375   12/14   Engle.

(Other references on following page)

UNITED STATES PATENTS

| | | | |
|---|---|---|---|
| 1,794,658 | 3/31 | Walsh | 56—219 |
| 1,844,750 | 2/32 | Ellis. | |
| 2,455,905 | 12/48 | Ronning et al. | 56—21 XR |
| 2,565,800 | 8/51 | Brinkley | 56—158 |
| 2,580,480 | 1/52 | Strehlow et al. | 180—1 |
| 2,580,481 | 1/52 | Strehlow et al. | 180—1 |
| 2,644,284 | 7/53 | Oberholtz et al. | 56—21 |
| 2,695,485 | 11/54 | Krause et al. | 56—21 |
| 2,780,046 | 2/56 | Edwards | 56—157 |
| 2,822,812 | 2/58 | Edwards | 130—27 |
| 3,011,497 | 12/61 | Larsson | 130—27 |

T. GRAHAM CRAVER, *Primary Examiner.*

CARL W. ROBINSON, ANTONIO F. GUIDA,
*Examiners.*